United States Patent
Chen et al.

(10) Patent No.: US 11,503,329 B2
(45) Date of Patent: Nov. 15, 2022

(54) METHOD AND APPARATUS OF SIMPLIFIED SUB-MODE FOR VIDEO CODING

(71) Applicant: MEDIATEK INC., Hsinchu (TW)

(72) Inventors: Chun-Chia Chen, Hsinchu (TW);
Chih-Wei Hsu, Hsinchu (TW);
Tzu-Der Chuang, Hsinchu (TW);
Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/265,949

(22) PCT Filed: Aug. 15, 2019

(86) PCT No.: PCT/CN2019/100812
§ 371 (c)(1),
(2) Date: Feb. 4, 2021

(87) PCT Pub. No.: WO2020/035029
PCT Pub. Date: Feb. 20, 2020

(65) Prior Publication Data
US 2021/0266589 A1    Aug. 26, 2021

Related U.S. Application Data

(60) Provisional application No. 62/744,422, filed on Oct. 11, 2018, provisional application No. 62/742,281, (Continued)

(51) Int. Cl.
H04N 19/52    (2014.01)
H04N 19/96    (2014.01)
(Continued)

(52) U.S. Cl.
CPC ............ *H04N 19/52* (2014.11); *H04N 19/105* (2014.11); *H04N 19/119* (2014.11); *H04N 19/96* (2014.11)

(58) Field of Classification Search
CPC .... H04N 19/52; H04N 19/105; H04N 19/119; H04N 19/96
See application file for complete search history.

(56) References Cited

U.S. PATENT DOCUMENTS

| 5,608,458 A | 3/1997 | Chen et al. |
| 8,964,833 B2 | 2/2015 | Auwera et al. |
| (Continued) | | |

FOREIGN PATENT DOCUMENTS

| CN | 102934434 A | 2/2013 |
| CN | 102939758 A | 2/2013 |
| (Continued) | | |

OTHER PUBLICATIONS

International Search Report and Written Opinion dated Oct. 31, 20191, issued in application No. PCT/CN2019/100812.
(Continued)

*Primary Examiner* — Anner N Holder
(74) *Attorney, Agent, or Firm* — McClure, Qualey & Rodack, LLP

(57) ABSTRACT

A method and apparatus of Inter prediction for video coding are disclosed. According to one method, a sub-block motion vector prediction (MVP) mode is turned off for small size coding units (CUs). In another method, if the neighbouring reference block for a current coding unit (CU) is in a root CU region, the neighbouring reference block is not used to derive a Merge candidate or a modified neighbouring reference block on the shared boundary of the root CU is used to derive the Merge candidate for the current block. In yet another method, a shared sub-block Merge candidate list is (Continued)

derived for sub-CUs within a root CU region or an MER (Merge estimation region). If a neighbouring reference block is within the same MER as a current sub-CU, the neighbouring reference block is not used for deriving a candidate for the shared sub-CU Merge list.

4 Claims, 12 Drawing Sheets

Related U.S. Application Data filed on Oct. 6, 2018, provisional application No. 62/740,430, filed on Oct. 3, 2018, provisional application No. 62/719,175, filed on Aug. 17, 2018.

(51) Int. Cl.
  *H04N 19/105* (2014.01)
  *H04N 19/119* (2014.01)

(56) References Cited

U.S. PATENT DOCUMENTS

| | | | |
|---|---|---|---|
| 9,800,890 | B2 | 10/2017 | Takehara et al. |
| 9,961,364 | B2 | 5/2018 | Tsai et al. |
| 10,271,064 | B2 | 4/2019 | Chien et al. |
| 10,582,215 | B2 | 3/2020 | Jang et al. |
| 2013/0070854 | A1* | 3/2013 | Wang .......... H04N 19/52 375/E7.125 |
| 2013/0070857 | A1 | 3/2013 | Kondo |
| 2013/0114717 | A1 | 5/2013 | Zheng et al. |
| 2013/0188715 | A1 | 7/2013 | Seregin et al. |
| 2013/0208799 | A1* | 8/2013 | Srinivasamurthy .. H04N 19/119 375/240.16 |
| 2014/0044171 | A1 | 2/2014 | Takehara et al. |
| 2014/0341284 | A1 | 11/2014 | Kim et al. |
| 2015/0010084 | A1* | 1/2015 | Yie .......... H04N 19/119 375/240.16 |
| 2015/0071357 | A1 | 3/2015 | Pang et al. |
| 2016/0100182 | A1* | 4/2016 | Lee .......... H04N 19/593 375/240.16 |
| 2016/0219302 | A1* | 7/2016 | Liu .......... H04N 19/583 |
| 2017/0347128 | A1 | 11/2017 | Panuspone et al. |
| 2018/0048889 | A1 | 2/2018 | Zhang et al. |
| 2018/0288430 | A1* | 10/2018 | Chen .......... H04N 19/176 |
| 2018/0359483 | A1* | 12/2018 | Chen .......... H04N 19/44 |
| 2020/0045307 | A1 | 2/2020 | Jang |
| 2021/0136363 | A1* | 5/2021 | Jang .......... H04N 19/176 |
| 2021/0160531 | A1* | 5/2021 | Zhang .......... H04N 19/105 |

FOREIGN PATENT DOCUMENTS

| | | | |
|---|---|---|---|
| CN | 103430547 | A | 12/2013 |
| CN | 103718552 | A | 4/2014 |
| CN | 107690809 | A | 2/2018 |
| CN | 108141582 | A | 6/2018 |
| EP | 2 763 415 | A1 | 8/2014 |
| EP | 2 787 728 | A2 | 10/2014 |
| EP | 2 806 636 | A1 | 11/2014 |
| JP | 2016001894 | A * | 1/2016 |
| TW | 201739252 | A | 11/2017 |
| WO | 2017/042434 | A1 | 3/2017 |
| WO | 2017/118411 | A1 | 7/2017 |
| WO | 2017/148345 | A1 | 9/2017 |
| WO | 2017/156705 | A1 | 9/2017 |
| WO | 2017/220164 | A1 | 12/2017 |
| WO | 2018/045944 | A1 | 3/2018 |
| WO | 2018066927 | A1 | 4/2018 |
| WO | 2018/129172 | A1 | 7/2018 |

OTHER PUBLICATIONS

Chinese language office action dated May 19, 2020, issued in application No. TW 108129211.
International Search Report and Written Opinion dated Nov. 19, 2019, issued in application No. PCT/CN2019/101116.
International Search Report and Written Opinion dated Nov. 12, 2019, issued in application No. PCT/CN2019/100785.
Flynn, D., et al.; "High Efficiency Video Coding (HEVC) Range Extensions text specification: Draft 6;" Joint Collaborative Team on Video Coding (JCT-VC) of ITU-T SG 16 WP 3 and ISO/IEC JTC 1/SC 29/WG 11; Jan. 2014; pp. 1-370.
Chinese language office action dated Oct. 22, 2020, issued in application No. TW 108129212.
Chinese Language Office Action dated Apr. 16, 2021, issued in Application No. 108129234.
Extended European Search Report dated May 2, 2022, issued in application No. EP 19850484.7.
Extended European Search Report dated Jun. 7, 2022, issued in application No. EP 19849363.7.
Ahn, Y., et al.; "Modification of merge candidate derivation for binary split CUs;" Joint Video Exploration Team (JVET) of ITU-T SG 16 WP 3 and ISO/IEC JTC 1/SC 29/WG 11; Oct. 2017; pp. 1-6.
Sze, V., et al.; "High Efficiency Video Coding (HEVC);" Integrated Circuits and Systems; Aug. 2014; pp. 1-384.
Esenlik, S., et al.; "Non-CE4: Parallel Merge Estimation for VVC;" Joint Video Experts Team (JVET) of ITU-T SG 16 WP 3 and ISO/IEC JTC 1/SC 29/WG 11; Oct. 2018; pp. 1-8.
Jeon, Y., et al.; AHG10: Unified design on parallel merge/skip; Joint Collaborative Team on Video Coding (JCT-VC) of ITU-T SG 16 WP 3 and ISO/IEC JTC 1/SC 29/WG 11; Feb. 2012; pp. 1-10.

* cited by examiner

MXN/2
Symmetric vertical splitting

MXN/2
Symmetric horizontal splitting

M/4xN (L)

M/4xN (R)

MxN/4 (U)

MxN/4 (D)

| Merge_idx | L0 | L1 |
|---|---|---|
| 0 | mvL0_A,ref0 | - |
| 1 | - | mvL1_B,ref0 |
| 2 | mvL0_A,ref0 | mvL1_B,ref0 |
| 3 | | |
| 4 | | |

940

| Merge_idx | L0 | L1 |
|---|---|---|
| 0 | mvL0_A,ref0 | - |
| 1 | - | mvL1_B,ref0 |
| 2 | mvL0_A,ref0 | mvL1_B,ref0 |
| 3 | (0,0),ref0 | (0,0),ref0 |
| 4 | (0,0), ref1 | (0,0), ref1 |

950

960

| amvp_idx | L0 |
|---|---|
| 0 | mvL0_A |
| 1 | mvL0_B |
| 2 | |

| amvp_idx | L1 |
|---|---|
| 0 | mvL1_A |
| 1 | |
| 2 | |

962

970

| amvp_idx | L0 |
|---|---|
| 0 | mvL0_A |
| 1 | mvL0_B |
| 2 | (0,0) |

| amvp_idx | L1 |
|---|---|
| 0 | mvL1_A |
| 1 | (0,0) |
| 2 | |

972

METHOD AND APPARATUS OF SIMPLIFIED SUB-MODE FOR VIDEO CODING

CROSS REFERENCE TO RELATED PATENT APPLICATION(S)

The present invention claims priority to U.S. Provisional Patent Application, Ser. No. 62/719,175, filed on Aug. 17, 2018, U.S. Provisional Patent Application, Ser. No. 62/740,430, filed on Oct. 3, 2018, U.S. Provisional Patent Application, Ser. No. 62/742,281, filed on Oct. 6, 2018 and U.S. Provisional Patent Application, Ser. No. 62/744,422 filed on Oct. 11, 2018. The U.S. Provisional Patent Applications are hereby incorporated by reference in their entireties.

TECHNICAL FIELD

The present invention relates to Merge mode for video coding. In particular, the present invention discloses techniques to improve hardware processing efficiency by imposing restrictions on handling Merge candidates. Furthermore, techniques to handle sub-CU Merge candidates in a shared candidate list for sub-CUs under a root CU or within a shared region are disclosed.

BACKGROUND

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set). This representation results in a recursive structure as specified by a coding tree (also referred to as a partition tree structure) 120 in FIG. 1. The CTU partition 110 is shown in FIG. 1, where the solid lines indicate CU boundaries. The decision whether to code a picture area using Inter-picture (temporal) or Intra-picture (spatial) prediction is made at the CU level. Since the minimum CU size can be 8×8, the minimum granularity for switching between different basic prediction types is 8×8.

Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU as shown in FIG. 2, including 2N×2N, 2N×N, N×2N, N×N, 2N×nU, 2N×nD, nL×2N and nR×2N partition types. Unlike the CU, the PU may only be split once according to HEVC. The partitions shown in the second row correspond to asymmetric partitions, where the two partitioned parts have different sizes.

After obtaining the residual block by the prediction process based on PU splitting type, the prediction residues of a CU can be partitioned into transform units (TU) according to another quadtree structure which is analogous to the coding tree for the CU as shown in FIG. 1. The solid lines indicate CU boundaries and dotted lines indicate TU boundaries. The TU is a basic representative block having residual or transform coefficients for applying the integer transform and quantization. For each TU, one integer transform having the same size to the TU is applied to obtain residual coefficients. These coefficients are transmitted to the decoder after quantization on a TU basis.

The terms coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

Alternatively, a binary tree block partitioning structure is proposed in JCTVC-P1005 (D. Flynn, et al, "HEVC Range Extensions Draft 6", Joint Collaborative Team on Video Coding (JCT-VC) of ITU-T SG 16 WP 3 and ISO/IEC JTC 1/SC 29/WG 11, 16th Meeting: San Jose, US, 9-17 Jan. 2014, Document: JCTVC-P1005). In the proposed binary tree partitioning structure, a block can be recursively split into two smaller blocks using various binary splitting types as shown in FIG. 3. The most efficient and simplest ones are the symmetric horizontal and vertical split as shown in the top two splitting types in FIG. 3. For a given block of size M×N, a flag is signalled to indicate whether the given block is split into two smaller blocks. If yes, another syntax element is signalled to indicate which splitting type is used. If the horizontal splitting is used, the given block is split into two blocks of size M×N/2. If the vertical splitting is used, the given block is split into two blocks of size M/2×N. The binary tree splitting process can be iterated until the size (width or height) for a splitting block reaches a minimum allowed block size (width or height). The minimum allowed block size can be defined in high level syntax such as SPS. Since the binary tree has two splitting types (i.e., horizontal and vertical), the minimum allowed block width and height should be both indicated. Non-horizontal splitting is implicitly implied when splitting would result in a block height smaller than the indicated minimum. Non-vertical splitting is implicitly implied when splitting would result in a block width smaller than the indicated minimum. FIG. 4 illustrates an example of block partitioning 410 and its corresponding binary tree 420. In each splitting node (i.e., non-leaf node) of the binary tree, one flag is used to indicate which splitting type (horizontal or vertical) is used, where 0 may indicate horizontal splitting and 1 may indicate vertical splitting.

The binary tree structure can be used for partitioning an image area into multiple smaller blocks such as partitioning a slice into CTUs, a CTU into CUs, a CU into PUs, or a CU into TUs, and so on. The binary tree can be used for partitioning a CTU into CUs, where the root node of the binary tree is a CTU and the leaf node of the binary tree is CU. The leaf nodes can be further processed by prediction and transform coding. For simplification, there is no further partitioning from CU to PU or from CU to TU, which means CU equal to PU and PU equal to TU. Therefore, in other words, the leaf node of the binary tree is the basic unit for prediction and transforms coding.

QTBT Structure

Binary tree structure is more flexible than quadtree structure since more partition shapes can be supported, which is also the source of coding efficiency improvement. However, the encoding complexity will also increase in order to select the best partition shape. In order to balance the complexity and coding efficiency, a method to combine the quadtree and binary tree structure, which is also called a quadtree plus binary tree (QTBT) structure, has been disclosed. According to the QTBT structure, a CTU (or CTB for I slice) is the root node of a quadtree and the CTU is firstly partitioned by a quadtree, where the quadtree splitting of one node can be iterated until the node reaches the minimum allowed quadtree leaf node size (i.e., MinQTSize). If the quadtree leaf node size is not larger than the maximum allowed binary tree root node size (i.e., MaxBTSize), it can be further partitioned by a binary tree. The binary tree splitting of one node can be iterated until the node reaches the minimum allowed binary tree leaf node size (i.e., MinBTSize) or the maximum allowed binary tree depth (i.e., MaxBTDepth). The binary tree leaf node, namely CU (or CB for I slice), will be used for prediction (e.g. Intra-picture or inter-picture prediction) and transform without any further partitioning. There are two splitting types in the binary tree splitting: symmetric horizontal splitting and symmetric vertical splitting. In the QTBT structure, the minimum allowed quadtree leaf node size, the maximum allowed binary tree root node size, the minimum allowed binary tree leaf node width and height, and the maximum allowed binary tree depth can be indicated in the high level syntax such as in SPS. FIG. 5 illustrates an example of block partitioning 510 and its corresponding QTBT 520. The solid lines indicate quadtree splitting and dotted lines indicate binary tree splitting. In each splitting node (i.e., non-leaf node) of the binary tree, one flag indicates which splitting type (horizontal or vertical) is used, 0 may indicate horizontal splitting and 1 may indicate vertical splitting.

The above QTBT structure can be used for partitioning an image area (e.g. a slice, CTU or CU) into multiple smaller blocks such as partitioning a slice into CTUs, a CTU into CUs, a CU into PUs, or a CU into TUs, and so on. For example, the QTBT can be used for partitioning a CTU into CUs, where the root node of the QTBT is a CTU which is partitioned into multiple CUs by a QTBT structure and the CUs are further processed by prediction and transform coding. For simplification, there is no further partitioning from CU to PU or from CU to TU. That means CU equal to PU and PU equal to TU. Therefore, in other words, the leaf node of the QTBT structure is the basic unit for prediction and transform.

An example of QTBT structure is shown as follows. For a CTU with size 128×128, the minimum allowed quadtree leaf node size is set to 16×16, the maximum allowed binary tree root node size is set to 64×64, the minimum allowed binary tree leaf node width and height both is set to 4, and the maximum allowed binary tree depth is set to 4. Firstly, the CTU is partitioned by a quadtree structure and the leaf quadtree unit may have size from 16×16 (i.e., minimum allowed quadtree leaf node size) to 128×128 (equal to CTU size, i.e., no split). If the leaf quadtree unit is 128×128, it cannot be further split by binary tree since the size exceeds the maximum allowed binary tree root node size 64×64. Otherwise, the leaf quadtree unit can be further split by binary tree. The leaf quadtree unit, which is also the root binary tree unit, has binary tree depth as 0. When the binary tree depth reaches 4 (i.e., the maximum allowed binary tree as indicated), no splitting is implicitly implied. When the block of a corresponding binary tree node has width equal to 4, non-horizontal splitting is implicitly implied. When the block of a corresponding binary tree node has height equal to 4, non-vertical splitting is implicitly implied. The leaf nodes of the QTBT are further processed by prediction (Intra picture or Inter picture) and transform coding.

For I-slice, the QTBT tree structure is usually applied with the luma/chroma separately coded coding. For example, the QTBT tree structure is applied separately to luma and chroma components for I-slice, and applied simultaneously to both luma and chroma (except when certain minimum sizes being reached for chroma) for P- and B-slices. In other words, in an I-slice, the luma CTB has its QTBT-structured block partitioning and the two chroma CTBs have another QTBT-structured block partitioning. In another example, the two chroma CTBs can also have their own QTBT-structured block partitions.

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of a hybrid coding architecture in HEVC, there are two kinds of prediction modes (i.e., Intra prediction and Inter prediction) for each PU. For Intra prediction modes, the spatial neighbouring reconstructed pixels can be used to generate the directional predictions. There are up to 35 directions in HEVC. For Inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the Inter prediction direction to specify the prediction directions among bi-prediction, and uni-prediction which are list 0 (i.e., L0) and list 1 (i.e., L1), accompanied with the reference frame index for each list should also be encoded and transmitted.

When a PU is coded in either Skip or Merge mode, no motion information is transmitted except for the Merge index of the selected candidate since the Skip and Merge modes utilize motion inference methods. Since the motion vector difference (MVD) is zero for the Skip and Merge modes, the MV for the Skip or Merge coded block is the same as the motion vector predictor (MVP) (i.e., MV=MVP+MVD=MVP). Accordingly, the Skip or Merge coded block obtains the motion information from spatially neighbouring blocks (spatial candidates) or a temporal block (temporal candidate) located in a co-located picture. The co-located picture is the first reference picture in list 0 or list 1, which is signalled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

Multi-Type-Tree (MTT) block partitioning extends the concept of the two-level tree structure in QTBT by allowing both the binary tree and triple tree partitioning methods in the second level of MTT. The two levels of trees in MTT are called region tree (RT) and prediction tree (PT) respectively. The first level RT is always quad-tree (QT) partitioning, and the second level PT may be either binary tree (BT) partitioning or triple tree (TT) partitioning. For example, a CTU is firstly partitioned by RT, which is QT partitioning, and each RT leaf node may be further split by PT, which is either BT or TT partitioning. A block partitioned by PT may be further split with PT until a maximum PT depth is reached. For example, a block may be first partitioned by vertical BT partitioning to generate a left sub-block and a right sub-block, and the left sub-block is further split by horizontal TT partitioning while the right sub-block is further split by horizontal BT partitioning. A PT leaf node is the basic Coding Unit (CU) for prediction and transform and will not be further split.

FIG. 6 illustrates an example of tree-type signalling for block partitioning according to MTT block partitioning. RT signalling may be similar to the quad-tree signalling in QTBT block partitioning. For signalling a PT node, one additional bin is signalled to indicate whether it is a binary tree partitioning or triple tree partitioning. For a block split by RT, a first bin is signalled to indicate whether there is another RT split, if the block is not further split by RT (i.e. the first bin is 0), a second bin is signalled to indicate whether there is a PT split. If the block is also not further split by PT (i.e. the second bin is 0), then this block is a leaf node. If the block is then split by PT (i.e. the second bin is 1), a third bin is sent to indicate horizontal or vertical partitioning followed by a fourth bin for distinguishing binary tree (BT) or triple tree (TT) partitioning.

After constructing the MTT block partition, MTT leaf nodes are CUs, which are used for prediction and transform without any further partitioning. In MTT, the proposed tree structure is coded separately for luma and chroma in I slice, and applied simultaneously to both luma and chroma (except when certain minimum sizes are reached for chroma) in P and B slice. That is to say that, in I slice, the luma CTB has its QTBT-structured block partitioning, and the two chroma CTBs have another QTBT-structured block partitioning.

While the proposed MTT is able to improve performance by adaptively partitioning blocks for prediction and transform, it is desirable to further improve the performance whenever possible in order to achieve an overall efficiency target.

Merge Mode

To increase the coding efficiency of motion vector (MV) coding in HEVC, HEVC has the Skip, and Merge mode. Skip and Merge modes obtain the motion information from spatially neighbouring blocks (spatial candidates) or a temporal co-located block (temporal candidate) as shown in FIG. 7. When a PU is Skip or Merge mode, no motion information is coded, instead, only the index of the selected candidate is coded. For Skip mode, the residual signal is forced to be zero and not coded. In HEVC, if a particular block is encoded as Skip or Merge, a candidate index is signalled to indicate which candidate among the candidate set is used for merging. Each merged PU reuses the MV, prediction direction, and reference picture index of the selected candidate.

For Merge mode in HM-4.0 (HEVC Test Model 4.0) in HEVC, as shown in FIG. 7, up to four spatial MV candidates are derived from $A_0$, $A_1$, $B_0$ and $B_1$, and one temporal MV candidate is derived from $T_{BR}$ or $T_{CTR}$ ($T_{BR}$ is used first, if $T_{BR}$ is not available, $T_{CTR}$ is used instead). Note that if any of the four spatial MV candidates is not available, the position $B_2$ is then used to derive MV candidate as a replacement. After the derivation process of the four spatial MV candidates and one temporal MV candidate, removing redundancy (pruning) is applied to remove redundant MV candidates. If after removing redundancy (pruning), the number of available MV candidates is smaller than five, three types of additional candidates are derived and are added to the candidate set (candidate list). The encoder selects one final candidate within the candidate set for Skip, or Merge modes based on the rate-distortion optimization (RDO) decision, and transmits the index to the decoder. In this disclosure, the Skip and Merge mode are denoted as "Merge mode".

FIG. 7 also shows the neighbouring PUs used to derive the spatial and temporal MVPs for both AMVP and Merge scheme. In AMVP, the left MVP is the first available one from $A_0$, $A_1$, the top MVP is the first available one from $B_0$, $B_1$, $B_2$, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not scaled MVP, the second top MVP can be derived if there is a scaled MVP among $B_0$, $B_1$, and $B_2$. The list size of MVPs of AMVP is 2 in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.

For Skip and Merge mode, as shown in FIG. 7, up to four spatial Merge index are derived from $A_0$, $A_1$, $B_0$ and $B_1$, and one temporal Merge index is derived from $T_{BR}$ or $T_{CTR}$ ($T_{BR}$ is used first, if $T_{BR}$ is not available, $T_{CTR}$ is used instead). Note that if any of the four spatial Merge index is not available, the position $B_2$ is then used to derive Merge index as a replacement. After the derivation process of the four spatial Merge index and one temporal Merge index, removing redundancy is applied to remove redundant Merge index. If after removing redundancy, the number of available Merge index is smaller than five, three types of additional candidates are derived and are added to the candidates list.

Additional bi-predictive Merge candidates are created by using original Merge candidates. The additional candidates are divided into three candidate types:

1. Combined bi-predictive Merge candidate (candidate type 1)
2. Scaled bi-predictive Merge candidate (candidate type 2)
3. Zero vector Merge/AMVP candidate (candidate type 3)

In candidate type 1, combined bi-predictive Merge candidates are created by combining original Merge candidates. In particular, two candidates in original candidates, which have mvL0 (the motion vector in list 0) and refIdxL0 (the reference picture index in list 0) or mvL1 (the motion vector in list 1) and refIdxL1 (the reference picture index in list 1), are used to created bi-predictive Merge candidates. FIG. 8 illustrates an example of the derivation process for combined bi-predictive Merge candidate. The candidate set 810 corresponds to an original candidate list, which includes mvL0_A, ref0 (831) in L0 and mvL1_B, ref (832) in L1. A bi-prediction MVP 833 can be formed by combining the candidates in L0 and L1 as indicated by the process 830 in FIG. 8.

In candidate type 2, scaled bi-predictive Merge candidates are created by scaling original Merge candidate. In particular, one candidate in original candidates, which have mvLX (the motion vector in list X) and refIdxLX (the reference picture index in list X), X can be 0 or 1, is used to created bi-predictive Merge candidates. For example, one candidate A is list 0 uni-predictive with mvL0_A and ref0, ref0 is firstly copied to reference index ref0' in list 1. After that, mvL0'_A is calculated by scaling mvL0_A with ref0 and ref0'. Then, bi-predictive Merge candidate which has mvL0_A and ref0 in list 0 and mvL0'_A and ref0' in list 1, is created and added into Merge candidate list. An example of the derivation process of the scaled bi-predictive Merge candidate is shown in FIG. 9A, where candidate list 910 corresponds to an original candidate list and candidate list 920 corresponds to the expanded candidate list including two generated bi-prediction MVPs as illustrated by process 930.

In candidate type 3, Zero vector Merge/AMVP candidates are created by combining zero vectors and reference index, which can be referred. FIG. 9B illustrates an example for adding zero vector Merge candidates, where candidate list 940 corresponds to an original Merge candidate list and candidate list 950 corresponds to the extended Merge candidate list by adding zero candidates. FIG. 9C illustrates an example for adding zero vector AMVP candidates, where candidate lists 960 (L0) and 962 (L1) correspond to original AMVP candidate lists and the candidate list 970 (L0) and 972 (L1) correspond to the extended AMVP candidate lists by adding zero candidates. If zero vector candidates are not duplicated, it is added to Merge/AMVP candidates list.

Conventional Sub-PU Temporal Motion Vector Prediction (SbTMVP)

The ATMVP (Advanced Temporal Motion Vector Prediction) mode (or also called Sub-PU Temporal Motion Vector Prediction (SbTMVP)) is a Sub-PU based mode for Merge candidate, it uses a spatial neighbour to get an initial vector, and the initial vector (to be modified in some embodiments) is used to get the coordinate of the collocated block on the collocated picture. Then, the sub-CU (usually 4×4 or 8×8) motion information of the collocated block on the collocated picture are then retrieved and filled into sub-CU (usually 4×4 or 8×8) motion buffer of the current Merge candidate. There are several variations of the ATMVP as disclosed in JVET-C1001 (J. Chen, et al., "Algorithm Description of Joint Exploration Test Model 3 (JEM3)", Joint Video Exploration Team (JVET) of ITU-T SG 16 WP 3 and ISO/IEC JTC 1/SC 29/WG 11 : 3rd Meeting: Geneva, CH, 26 May-1 Jun. 2016, Document: JVET-C1001) and JVET-K0346 (X. Xiu, et al., "CE4-related: One simplified design of advanced temporal motion vector prediction (ATMVP)", Joint Video Experts Team (JVET) of ITU-T SG 16 WP 3 and ISO/IEC JTC 1/SC 29/WG 11, 11th Meeting: Ljubljana, S I, 10-18 Jul. 2018, Document: JVET-K0346).

Spatial-Temporal Motion Vector Prediction (STMVP)

The STMVP mode is a Sub-PU based mode for Merge candidate. The motion vectors of the sub-PUs are generated recursively in raster scan order. The derivation of MV for current sub-PU firstly identifies its two spatial neighbours. One temporal neighbour is then derived using some MV scaling. After retrieving and scaling the MVs, all available motion vectors (up to 3) are averaged to form an STMVP, which is assigned as the motion vector of the current sub-PU. Detailed descript description of STMVP can be found in section 2.3.1.2 of JVET-C1001.

History-Based Merge Mode Construction

The History Based Merge Mode is a variation of conventional Merge mode. The History Based Merge Mode stores Merge candidates of some previous CUs in a history array. Therefore, the current CU can use one or more candidates inside the history array, besides the original Merge candidate, to enrich the Merge mode candidates. Details of the History Based Merge Mode can be found in JVET-K0104 (L. Zhang, et al., "CE4-related: History-based Motion Vector Prediction", Joint Video Experts Team (JVET) of ITU-T SG 16 WP 3 and ISO/IEC JTC 1/SC 29/WG 11, 11th Meeting: Ljubljana, S I, 10-18 Jul. 2018, Document: JVET-K0104).

The history-based method can also be applied to AMVP candidate list.

Non-Adjacent Merge Candidate

The non-adjacent Merge candidates use some spatial candidates far away from the current CU. Variations of the non-adjacent Merge candidates can be found in JVET-K0228 (R. Yu, et al., "CE4-2.1: Adding non-adjacent spatial merge candidates", Joint Video Experts Team (JVET) of ITU-T SG 16 WP 3 and ISO/IEC JTC 1/SC 29/WG 11, 11th Meeting: Ljubljana, S I, 10-18 Jul. 2018, Document: JVET-K0104) and JVET-K0286 (J. Ye, et al., "CE4: Additional merge candidates (Test 4.2.13)", Joint Video Experts Team (JVET) of ITU-T SG 16 WP 3 and ISO/IEC JTC 1/SC 29/WG 11, 11th Meeting: Ljubljana, S I, 10-18 Jul. 2018, Document: JVET-K0104).

The non-adjacent-based method can also be applied to AMVP candidate list.

IBC Mode

Current picture referencing (CPR) or Intra block copy (IBC) has been proposed during the standardization of HEVC SCC extensions. It has been proved to be efficient for coding screen content video materials. The IBC operation is very similar to original Inter mode in video codec. However, the reference picture is the current decoded frame instead of previously coded frames. Some details of IBC can be found in JVET-K0076 (X. Xu, et al., "CE8-2.2: *Current picture referencing using reference index signaling*", Joint Video Experts Team (JVET) of ITU-T SG 16 WP 3 and ISO/IEC JTC 1/SC 29/WG 11, 11th Meeting: Ljubljana, S I, 10-18 Jul. 2018, Document: JVET-K0076) and a technical paper by Xu, et al. (X. Xu, et al., "*Intra Block Copy in HEVC Screen Content Coding Extensions*," IEEE J. Emerg. Sel. Topics Circuits Syst., vol. 6, no. 4, pp. 409-419, 2016).

Affine Mode

In contribution ITU-T13-SG16-C1016 submitted to ITU-VCEG (Lin, et al., "Affine transform prediction for next generation video coding", ITU-U, Study Group 16, Question Q6/16, Contribution C1016, September 2015, Geneva, CH), a four-parameter affine prediction is disclosed, which includes the affine Merge mode. When an affine motion block is moving, the motion vector field of the block can be described by two control point motion vectors or four parameters as follows, where (vx, vy) represents the motion vector $$\begin{cases} x' = ax + by + e \\ y' = -bx + ay + f \\ vx = x - x' \\ vy = y - y' \end{cases} \overset{\Delta}{=} \begin{cases} vx = (1-a)x - by - e \\ vy = (1-a)y + bx - f \end{cases} \quad (1)$$

An example of the four-parameter affine model is shown in FIG. 10, where block 1010 corresponds to the current block and block 1020 corresponds to the reference block. The transformed block is a rectangular block. The motion vector field of each point in this moving block can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (2)$$

In the above equations, ($v_{0x}$, $v_{0y}$) is the control-point motion vector (i.e., $v_0$) at the upper-left corner of the block, and ($v_{1x}$, $v_{1y}$) is another control-point motion vector (i.e., $v_1$) at the upper-right corner of the block. When the MVs of two control points are decoded, the MV of each 4×4 block of the block can be determined according to the above equation. In other words, the affine motion model for the block can be specified by the two motion vectors at the two control points. Furthermore, while the upper-left corner and the upper-right corner of the block are used as the two control points, other two control points may also be used.

There are two kinds of affine candidates: Inherited affine candidate and Corner derived candidate (i.e., constructed candidate). For the inherited affine candidate, the current block inherits the affine model of a neighbouring block. All control point MVs are from the same neighbouring block. If the current block 1110 inherits the affine motion from block A1, the control-point MVs of block A1 are used as the control-point MVs of the current block as shown in FIG. 11A, where the block 1112 associated with block A1 is rotated to block 1114 based on the two control-point MVs ($v_0$ and $v_1$). Accordingly, the current block 1110 is rotated to block 1116. The inherited candidates are inserted before the corner derived candidates. The order to select a candidate for inheriting the control-point MVs is according to: (A0->A1) (B0->B1->B2).

In contribution ITU-T13-SG16-C1016, for an Inter mode coded CU, an affine flag is signalled to indicate whether the affine Inter mode is applied or not when the CU size is equal to or larger than 16×16. If the current block (e.g., current CU) is coded in affine Inter mode, a candidate MVP pair list is built using the neighbour valid reconstructed blocks. FIG. 11B illustrates the neighbouring block set used for deriving the corner-derived affine candidate. As shown in FIG. 11B, $\bar{v}_0$ corresponds to a motion vector of the block V0 at the upper-left corner of the current block 1120, which is selected from the motion vectors of the neighbouring block a0 (referred as the above-left block), a1 (referred as the inner above-left block) and a2 (referred as the lower above-left block). The $\bar{v}_1$ corresponds to motion vector of the block V1 at the upper-right corner of the current block 1120, which is selected from the motion vectors of the neighbouring block b0 (referred as the above block) and b1 (referred as the above-right block).

In the above equation, MVa is the motion vector associated with the blocks a0, a1 or a2, MVb is selected from the motion vectors of the blocks b0 and b1 and MVc is selected from the motion vectors of the blocks c0 and c1. The MVa and MVb that have the smallest DV are selected to form the MVP pair. Accordingly, while only two MV sets (i.e., MVa and MVb) are to be searched for the smallest DV, the third DV set (i.e., MVc) is also involved in the selection process. The third DV set corresponds to motion vector of the block at the lower-left corner of the current block 1110, which is selected from the motion vectors of the neighbouring block c0 (referred as the left block) and c1 (referred as the left-bottom block). In the example of FIG. 11B, the neighbouring blocks (a0, a1, a2, b0, b1, b2, c0 and c1) used to construct the control point MVs for affine motion model are referred as a neighbouring block set in this disclosure.

In ITU-T13-SG16-C-1016, an affine Merge mode is also proposed. If current is a Merge PU, the neighbouring five blocks (c0, b0, b1, c1, and a0 blocks in FIG. 11B) are checked to determine whether one of them is affine Inter mode or affine Merge mode. If yes, an affine_flag is signalled to indicate whether the current PU is affine mode. When the current PU is coded in affine Merge mode, it gets the first block coded with affine mode from the valid neighbour reconstructed blocks. The selection order for the candidate block is from left, above, above-right, left-bottom to above-left (i.e., c0→b0→b1→c1→a0) as shown in FIG. 11B. The affine parameter of the first affine coded block is used to derive the $v_0$ and $v_1$ for the current PU.

SUMMARY

A method and apparatus of Inter prediction for video coding allowing sub-block mode motion vector prediction are disclosed. According to one method of the present invention, input data related to a current block in a current picture are received at a video encoder side or a video bitstream corresponding to compressed data including the current block in the current picture is received at a video decoder side. A condition is determined based on a block size of the current block. If the condition is satisfied, current motion information associated with the current block is encoded or decoded using a coding tool set excluding a target sub-block mode coding tool. If the condition is not satisfied, the current motion information associated with the current block is encoded or decoded using the coding tool set including the target sub-block mode coding tool. In one embodiment, the target sub-block mode coding tool corresponds to subblock-based temporal motion vector prediction (SbTMVP).

In one embodiment, the condition is satisfied if the block size of the current block is smaller than a threshold. For example, the condition is satisfied if an area of the current block is smaller than the threshold. In another example, the condition is satisfied if a block width of the current block or a block height of the current block is smaller than the threshold.

In another method of the present invention, the current block corresponds to one target leaf block among multiple leaf blocks under a root node resulting from block partitioning of an area including the current block. An MER (Merge Estimation Region) is determined, where the MER encloses said multiple leaf blocks. If a reference block for the current block is inside the MER, a target candidate associated with the reference block is excluded from a Merge candidate list or a modified target candidate is included in the Merge candidate list, wherein the modified target candidate is derived based on a modified reference block outside the MER. Current motion information associated with the current block is encoded or decoded using the Merge candidate list.

In one embodiment, the Merge candidate list is derived for a sub-block mode. In another embodiment, the Merge candidate list is derived for SbTMVP (Subblock-based Temporal Motion Vector Prediction) mode. In yet another embodiment, the modified reference block is located adjacent to a boundary of the MER.

In yet another method of the present invention, the current CU corresponding to one target child CU among multiple child CUs under a root node resulting from block partitioning of an area including the current CU is received. A shared boundary enclosing said multiple child CUs is determined and said multiple child CUs have no coding dependency from each other so as to allow parallel coding processing of said multiple child CUs. A shared Merge list is derived based on one or more neighbouring reference blocks located adjacent to the shared boundary. Current motion information associated with said multiple child CUs is encoded or decoded using the shared Merge list.

In one embodiment, control-point MVs (motion vectors) of said one or more neighbouring reference blocks are used to derive one or affine Merge candidates for said multiple child CUs. In another embodiment, affine parameters of said one or more neighbouring reference blocks are used to derive one or affine Merge candidates for said multiple child CUs. For example, the affine parameters of said one or more neighbouring reference blocks correspond to motion vector gradients, starting MVs and locations of said one or more neighbouring reference blocks.

DETAILED DESCRIPTION OF PREFERRED IMPLEMENTATIONS

The following description is of the best-contemplated mode of carrying out the invention. This description is made for the purpose of illustrating the general principles of the invention and should not be taken in a limiting sense. The scope of the invention is best determined by reference to the appended claims.

In the present invention, some techniques to simplify sub-block Merge mode are disclosed.

Method—Shared Candidate List

Figure 12A:
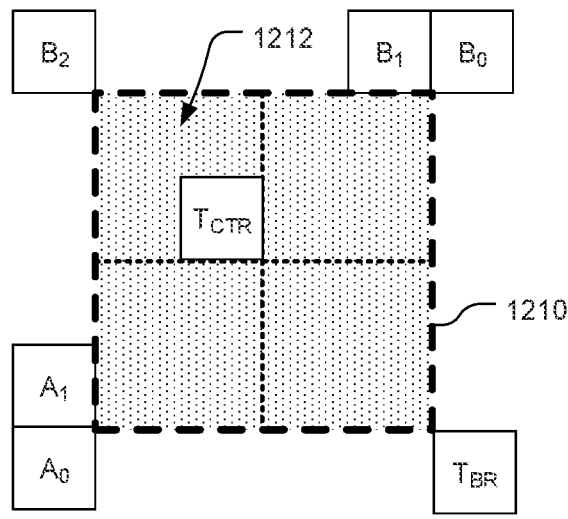
FIG. 12A-FIG. 12C illustrates examples of shared Merge list for sub-CUs within a root CU.
Figure 12B:
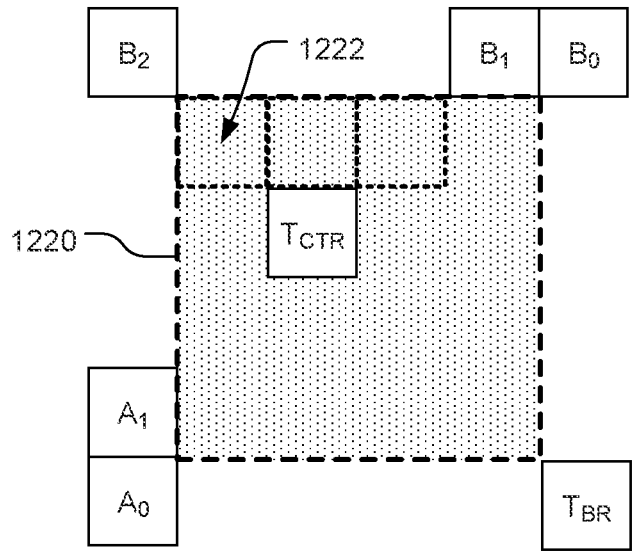
Figure 12C:
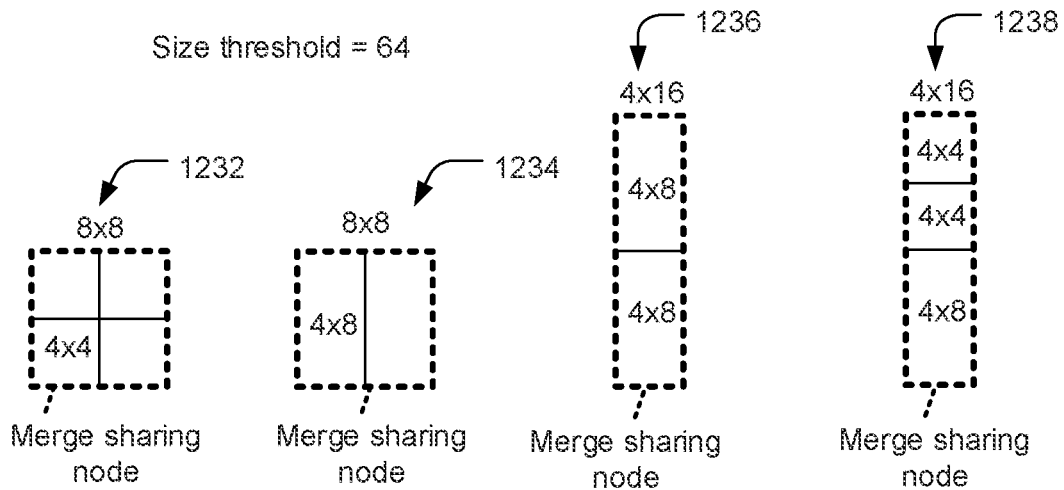

To simplify the codec operation complexity, a method of shared candidate list is proposed. The "candidate list" may correspond to Merge candidate list, AMVP candidate list or other types of prediction candidate list (e.g. DMVR (Decoder-side Motion Vector Refinement) or bi-lateral refinement candidate list). The basic idea of "shared candidate list" is to generate the candidate list on a bigger boundary (or one root of a sub-tree in QTBT Tree) so that the generated candidate list can be shared by all leaf-CUs inside the boundary or inside the sub-tree. Some examples of shared candidate lists are shown in FIG. 12A to FIG. 12C. In FIG. 12A, the root CU (1210) of sub-tree is shown by the large dashed box. A split leaf CU (1212) is shown as a smaller dashed box. The dashed box 1210 associated with the root CU also corresponds to a shared boundary for leaf CUs under the root leaf. In FIG. 12B, the shared boundary (1220) is shown by the large dashed box. A small leaf CU (1222) is shown as a smaller dashed box. FIG. 12C shows four examples of Merge sharing nodes. The shared merging candidate list is generated for the dotted virtual CU (i.e., Merge sharing node). In partition 1232, the Merge sharing node corresponding to an 8×8 block is split into 4 4×4 blocks. In partition 1234, the Merge sharing node corresponding to an 8×8 block is split into 2 4×8 blocks. In partition 1236, the Merge sharing node corresponding to a 4×16 block is split into 2 4×8 blocks. In partition 1238, the Merge sharing node corresponding to a 4×16 block is split into 2 4×4 blocks and 1 8×8 block.

There are two main embodiments of "shared candidate list": one is to share the candidate list inside a sub-tree; and the other is to share the candidate list inside a "common shared boundary".

Embodiment—Shared Candidate List Inside One Sub-Tree

Figure 1:
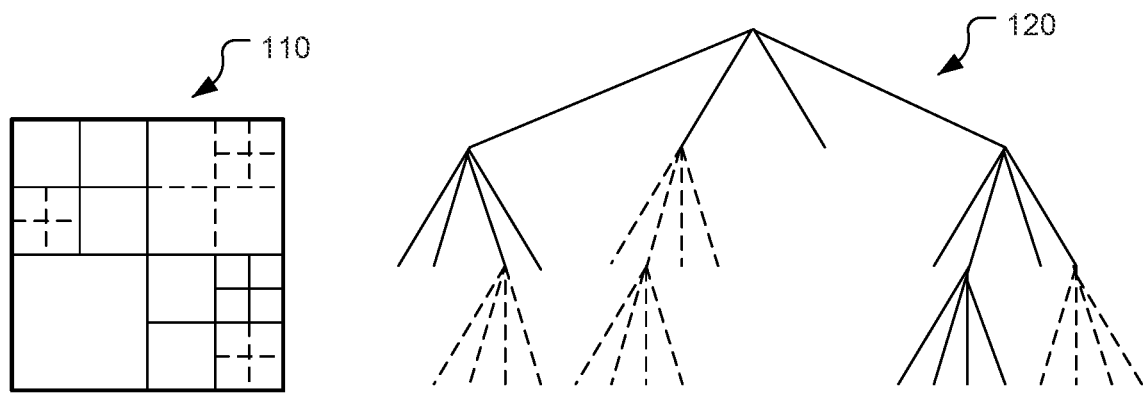
FIG. 1 illustrates an example of block partition using quadtree structure to partition a coding tree unit (CTU) into coding units (CUs).
Figure 2:
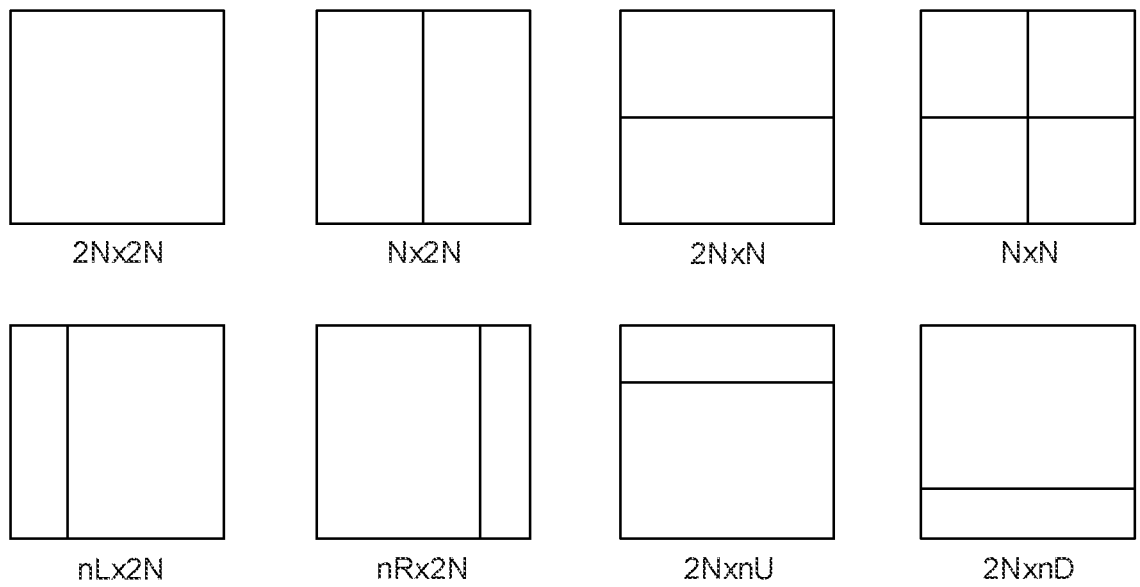
FIG. 2 illustrates asymmetric motion partition (AMP) according to High Efficiency Video Coding (HEVC), where the AMP defines eight shapes for splitting a CU into PU.
Figure 3:
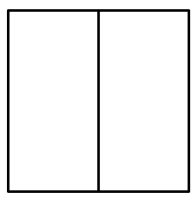
FIG. 3 illustrates an example of various binary splitting types used by a binary tree partitioning structure, where a block can be recursively split into two smaller blocks using the splitting types.
Figure 3:
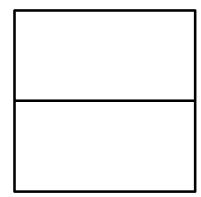
Figure 3:
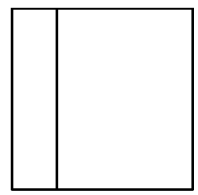
Figure 3:
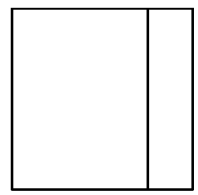
Figure 3:
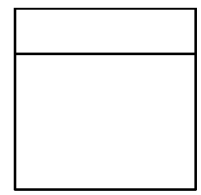
Figure 3:
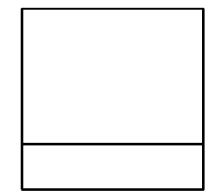
Figure 4:
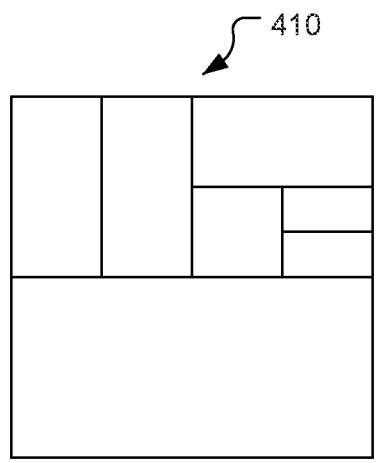
FIG. 4 illustrates an example of block partitioning and its corresponding binary tree, where in each splitting node (i.e., non-leaf node) of the binary tree, one syntax is used to indicate which splitting type (horizontal or vertical) is used, where 0 may indicate horizontal splitting and 1 may indicate vertical splitting.
Figure 4:
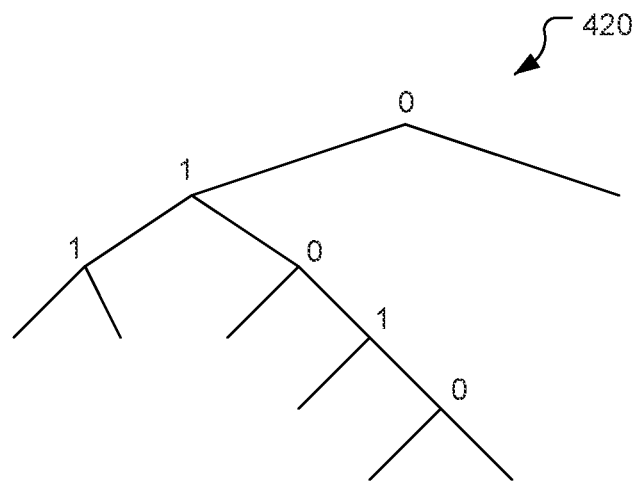
Figure 5:
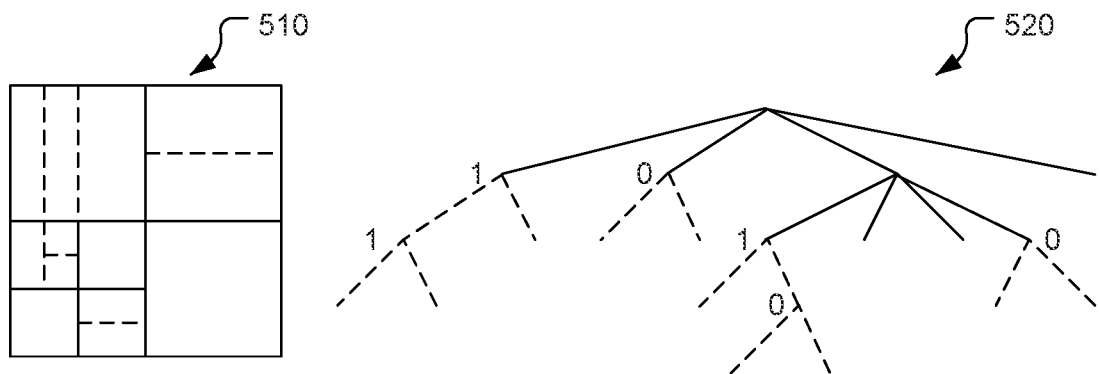
FIG. 5 illustrates an example of block partitioning and its corresponding QTBT, where the solid lines indicate quadtree splitting and dotted lines indicate binary tree splitting.
Figure 6:
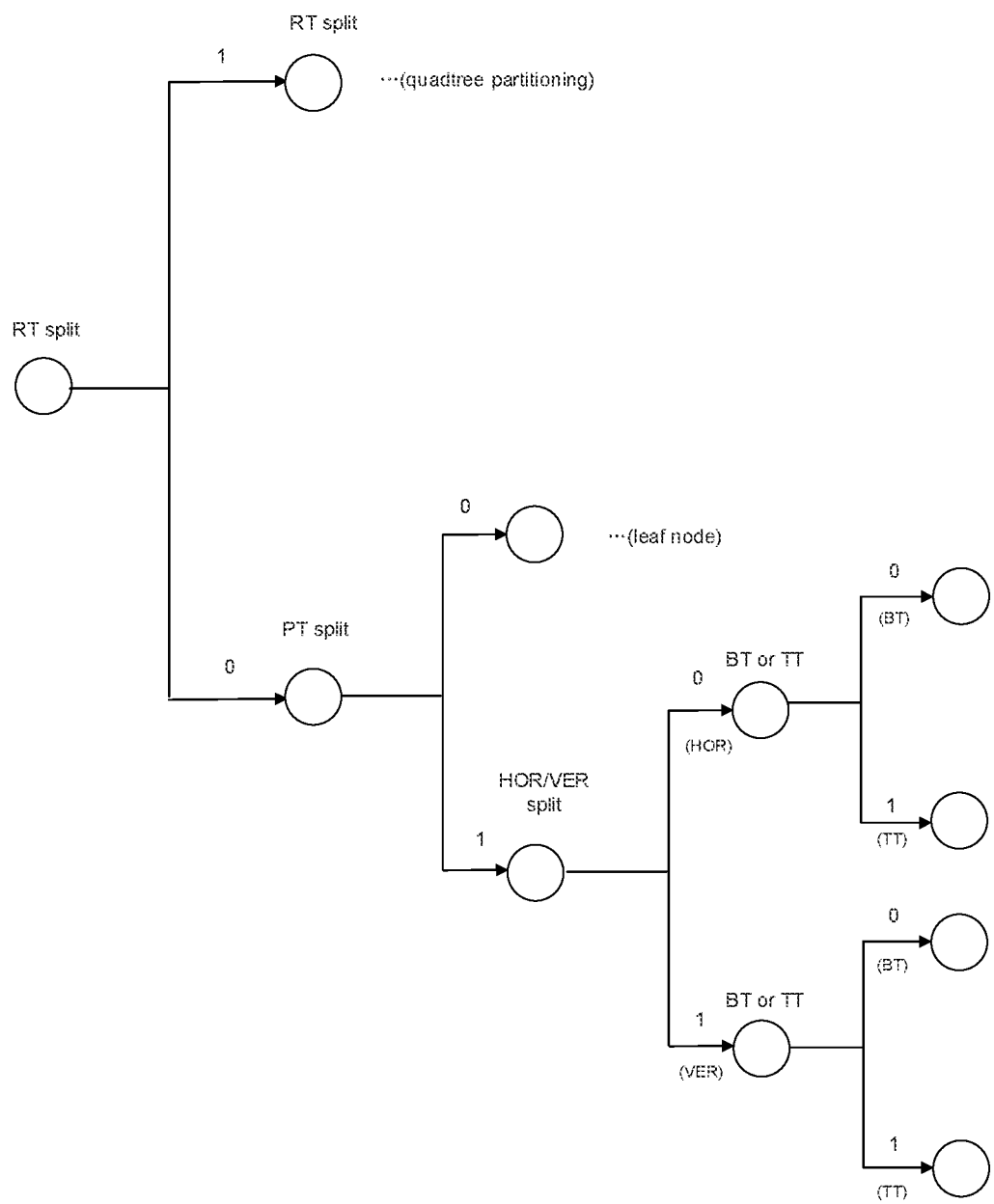
FIG. 6 illustrates an example of tree-type signalling for block partitioning according to MTT block partitioning, where RT signalling may be similar to the quad-tree signalling in QTBT block partitioning.
Figure 13:
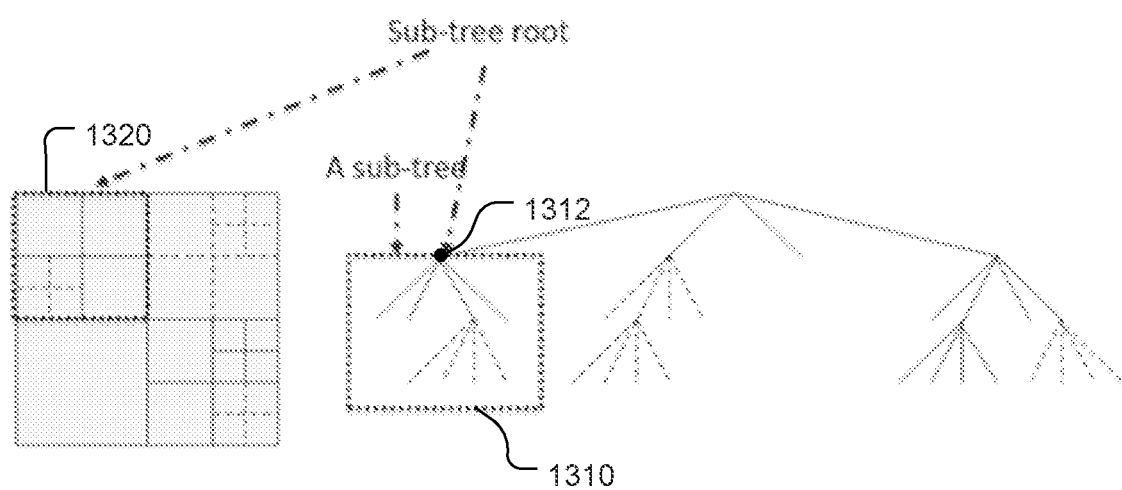
FIG. 13 illustrates an example of sub-tree, where the sub-tree root is a tree node inside the QTBT split tree.

The term "sub-tree" is defined as a sub-tree of QTBT split tree (e.g. the QTBT split tree 120 as shown in FIG. 1). One example of "sub-tree" (1310) is shown in FIG. 13, where the sub-tree root is a tree node (1312) inside the QTBT split tree. The final split leaf CUs of the sub-tree are inside this sub-tree. The block partition 1320 corresponds to the sub-tree 1310 in FIG. 13. In the proposed method, the candidate list (Merge mode, AMVP mode candidate or other type of prediction candidate list) can be generated on a shared-block-boundary base, where examples of the shared-block-boundary is based on the root CU boundary of sub-tree as shown in FIG. 12A. The candidate list is then re-used for all leaf CU inside the sub-tree. The common shared candidate list is generated by the root of the sub-tree. In other words, the spatial neighbour position and the temporal neighbouring position are all based on the rectangular boundary (i.e., shared boundary) of the root CU boundary of the sub-tree.

Embodiment—Shared Candidate List inside One "Common Shared Boundary"

In this embodiment, a "common shared boundary" is defined. One "common shared boundary" is a rectangular area of minimum-block (e.g. 4×4) aligned inside picture. Every CU inside the "common shared boundary" can use a common shared candidate list, where the common shared candidate list is generated based on the "common shared boundary". For example, the sub-blocks within the common shared boundary 1210 can share a Merge candidate list, where one or more Merge candidates are derived based on neighbouring blocks on the common shared boundary. In other words, the spatial neighbour position and the temporal neighbouring position are all based on the "common shared boundary".

Sub-CU Merge Candidate Handling in the Shared Candidate List

Some methods to achieve shared list for sub-CU candidate (e.g. ATMVP, STMVP or Affine merge in Merge mode). Examples of sub-CU candidate for the shared candidate list according to the present invention are shown as follows.

One method is to turn off the sub-CU candidate in the shared candidate list. Another method is to build the sub-CU candidate on the root CU (or built on shared-block-boundary), and for each "child CU for sharing", it directly retrieves the (corresponding area of) sub-CU motion information from the sub-CU candidate. For example, for a shared 16×8 boundary using ATMVP mode, the ATMVP can be generated on the shared boundary 16×8 as the conventional ATMVP method. When sharing this candidate list for 2 child CU (e.g. 8×8) inside the common boundary (16×8), the left 8×8 motion information of the 16×8 ATMVP can be directly retrieved to form the new 8×8 ATMVP for left 8×8 child CU. Similarly, the right 8×8 motion information of the 16×8 ATMVP can be directly retrieved to form the new 8×8 ATMVP for the right 8×8 child CU. Accordingly, the ATMVP candidates suitable for 8×8 are generated.

In another embodiment, the initial MV of the ATMVP (for deriving the collocated MV reference block in ATMVP) is derived by using the size/depth/shape/area/width/height of the root CU or the shared boundary. The initial MV of the ATMVP of the root CU or the shared boundary can be shared for the children CUs. The shared initial MV can be used to derive the collocated MV reference block of the child CU, and then derive the block MV or sub-block MVs of the child CU.

According to another embodiment of the present invention, it removes some candidates according to CU size. If a CU size is smaller than a pre-defined threshold related to CU size (e.g. area=16), some candidates are removed from the construction of the candidate list. As is known in the field, the CU size may correspond to the block width, block height or the block area. While the area is used as an example of the pre-defined threshold related to CU size, the width, height or both can be used as the pre-defined threshold related to CU size. There are several embodiments of removing some candidates. For example, ATMVP can be removed based on one or more pre-defined threshold related to the CU size.

According to one embodiment of the present invention, the sub-CU candidate in the shared candidate list is turned off. According to another embodiment of the present invention, the sub-CU candidate is built on the root CU (or built on shared-block-boundary). For each "child CU for sharing", the corresponding area of sub-CU motion information is directly retrieved from the sub-CU candidate. In an example of a shared boundary (size 16×8) with ATMVP mode, the ATMVP can be generated based on the shared boundary (size 16×8) as the conventional ATMVP method. When sharing this candidate list for two child CUs having size 8×8 inside the common boundary (i.e., 16×8), the left 8×8 motion information of the 16×8 ATMVP can be directly retrieved to form the new 8×8 ATMVP candidate for the left 8×8 child CU. Similarly, the right 8×8 motion information of the 16×8 ATMVP candidate can be directly retrieved to form the new 8×8 ATMVP candidate for the right 8×8 child CU. Accordingly, the ATMVP candidate suitable for the 8×8 can be derived based on the 16×8 block.

The proposed "shared candidate list", "shared Merge index" and other shared-attribute proposal according to embodiments of the present invention can be applied to other type of Merge list construction method, such as "history-based Merge mode construction", and "non-adjacent Merge candidate". In other words, the shared-attribute proposal is generally applicable to all Merge mode algorithms and AMVP mode algorithm.

Moreover, we further propose to signal a flag to switch on or off for the proposed sharing method. In one embodiment, a flag may be signalled to indicate whether "shared candidate list" is enabled. The minimum sizes of units in the signalling can also be separately coded in the sequence level, picture level, slice level, or PU level.

In one embodiment, when deriving the initial vector for ATMVP, the ATMVP is not used if the referenced neighbouring MV is inside of the root CU or shared boundary.

Method—Turning Off Sub-CU Merge Mode for Small CU

In this embodiment, it turns off (or called exclude) sub-CU Merge mode (e.g. ATMVP, STMVP or Affine merge) for small CUs (e.g. CU size lower than a threshold or any other CU-size related feature lower than a threshold).

In the sub-block Merge list, more than one ATMVP candidate can be inserted. For example, two ATMVP candidates can be inserted. In one embodiment, the two ATMVP candidates are inserted in front of the sub-block Merge list. In another embodiment, one ATMVP candidate is inserted in front of the sub-block Merge list, and the other one is inserted after one or more other types of sub-block candidate (e.g. affine candidate). In one example, the ATMVP is inserted at the third, fourth or fifth position of the sub-block merge list. In another example, the ATMVP is inserted after certain affine candidates in the sub-block merge list (e.g. after some affine inherited candidates or before the affine constructed candidates). In another embodiment, both ATMVP candidates are inserted after one or more other types of sub-block candidates (e.g. affine candidates).

Method—Shared List for Affine Coded Blocks

In the proposed shared list methods (e.g. Shared Candidate List inside One Sub-Tree and Common Shared Boundary), the root CU (also called the parent CU) or the shared boundary size/depth/shape/width/height is used to derive the candidate list. In the candidate list derivation, for any position-based derivation (e.g. the reference block position derivation according to the current block/CU/PU position/size/depth/shape/width/height), the root CU or the shared boundary position and shape/size/depth/width/height is used. In one embodiment, for affine inherit candidate derivation, the reference block position is first derived. When applying the shared list, the reference block position is derived by using the root CU or the shared boundary position, and shape/size/depth/width/height. In one example, the reference block positions are stored. When the child CU in the root CU or the shared boundary, the stored reference block position are used to find the reference block for affine candidate derivation.

In another embodiment, the control point MVs of the root CU or the shared boundary of each affine candidate in the candidate list are derived. The control point MVs of the root CU or the shared boundary of each affine candidate are shared for the children CUs in this root CU or the shared boundary. In one example, the derived control point MVs can be stored for the children CUs. For each child CU in the root CU or the shared boundary, the control point MVs of the root CU or the shared boundary are used to derive the control point MVs of the child CU or are used to derive the sub-block MVs of the child CU. In one example, the sub-block MVs of the child CU is derived from the control point MVs of child CUs, which are derived from the control MVs of the root CU or the shared boundary. In one example, the sub-block MVs of the child CU is derived from the control point MVs of the root CU or the shared boundary. In one example, the MVs of the sub-blocks in the root CU or the shared boundary can be derived at the root CU or the shared boundary. The derived sub-block MVs can be directly used. For the CU in the neighbouring CU outside of the root CU or the shared boundary, the control point MVs derived from the control point MVs of the root CU or the shared boundary are used to derive the affine inherited candidate. In another example, the control point MVs of the root CU or the shared boundary are used to derive the affine inherited candidate. In another example, the stored sub-block MVs of a CU are used to derive the affine inherited candidate. In another example, the stored sub-block MVs of the root CU or the shared boundary are used to derive the affine inherited candidate. In one embodiment, for a neighbouring reference CU in the above CTU row, the stored sub-block MVs (e.g. the bottom-left and bottom-right sub-block MVs, the bottom-left and bottom-centre sub-block MVs, or the bottom-centre and the bottom-right sub-block MVs) of the neighbouring reference CU are used to derive the affine inherited candidate instead of the control points of the root CU.

In another example, when coding the child CU, the position and shape/width/height/size of the root CU or the shared boundary can be stored or derived for the affine candidate reference block derivation. The 4-parameter affine model (in equation (3)) and 6-parameter affine model (in equation (4)) can be used to derive the affine candidate or the control point MVs of the children CUs. For example, in FIG. 12A, the CU inside the root CU can reference blocks $A_0$, $A_1$, $B_0$, $B_1$, $B_2$ and collocated block $T_{BR}$ and $T_{CTR}$ to derive the affine candidate. In another embodiment, for affine inherited candidate derivation, the current child CU position and shape/size/depth/width/height is used. If the reference block is inside the root CU or the shared boundary, it is not used for deriving the affine candidate.

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (3)$$

$$\begin{cases} v_x = \frac{(v_{1x} - v_{0x})}{x_1 - x_0}x + \frac{(v_{2x} - v_{0x})}{x_2 - x_0}y + v_{0x} \\ v_y = -\frac{(v_{1y} - v_{0y})}{x_1 - x_0}x + \frac{(v_{2y} - v_{0y})}{y_2 - x_0}y + v_{0y} \end{cases} \quad (4)$$

For affine corner derived candidate, the corner derived candidates for the child CU are not used according to one embodiment of the present invention. In another embodiment, the current child CU position and shape/size/depth/width/height is used. If the reference block/MV is inside the root CU or the shared boundary, it is not used for derive the affine candidate. In another embodiment, the shape/size/depth/width/height of the root CU or the shared boundary is used. The corner reference block/MV is derived based on the shape/size/depth/width/height of the root CU or the shared boundary. The derived MVs can be directly used as the control point MVs. In another embodiment, the corner reference block/MV is derived based on the shape/size/depth/width/height of the root CU or the shared boundary. The reference MV and its position can be used to derive the affine candidate by using the affine model (e.g. 4-parameter affine model or 6-parameter affine model). For example, the derived corner control pint MVs can be treated as the control point MVs of the root CU or the CU of the shared boundary. The affine candidate for child CU can be derived by using the equation (3) and/or (4). In other words, the affine parameters are generated based on neighbouring reference blocks on the shared boundary. Furthermore, the affine parameters may correspond to the gradients, starting MVs, and the locations of the neighbouring reference blocks as shown in the equation (3) and/or (4).

The control point MVs of the constructed affine candidate of the root CU or the root shared boundary can be stored. For the child CU in the root CU or the shared boundary, the stored reference block position are used to find the reference block for affine candidate derivation. In another embodiment, the control point MVs of the root CU or the shared boundary of each affine candidates in the candidate list are derived. The control point MVs of the root CU or the shared boundary of each affine candidates are shared for the children CUs in this root CU or the shared boundary. In one example, the derived control-point MVs can be stored for the children CUs. For each child CU in the root CU or the shared boundary, the control-point MVs of the root CU or the shared boundary are used to derive the control-point MVs of the child CU or are used to derive the sub-block MVs of the child CU. In one example, the sub-block MVs of the child CU is derived from the control point MVs of child CUs, which are derived from the control MVs of the root CU or the shared boundary. In one example, the sub-block MVs of the child CU is derived from the control point MVs of the root CU or the shared boundary. In one example, the MVs of the sub-blocks in the root CU or the shared boundary can be derived at the root CU or the shared boundary. The derived sub-block MVs can be directly used. For the CU in the neighbouring CU outside of the root CU or the shared boundary, the control-point MVs derived from the control point MVs of the root CU or the shared boundary are used to derive the affine inherited candidate. In another example, the control-point MVs of the root CU or the shared boundary are used to derive the affine inherited candidate. In another example, the stored sub-block MVs of a CU are used to derive the affine inherited candidate. In another example, the stored sub-block MVs of the root CU or the shared boundary are used to derive the affine inherited candidate. In one embodiment, for a neighbouring reference CU in the above CTU row, the stored sub-block MVs (e.g. the bottom-left and bottom-right sub-block MVs, or the bottom-left and bottom-centre sub-block MVs, or the bottom-centre and the bottom-right sub-block MVs) of the neighbouring reference CU are used to derive the affine inherited candidate instead of the control points of the root CU or the shared boundary that contains the neighbouring reference CU, or instead of the control point MVs of the neighbouring reference CU.

In another embodiment, the derived control point MVs from the root CU and the shared boundary can be used directly without affine model transforming.

Figure 7:
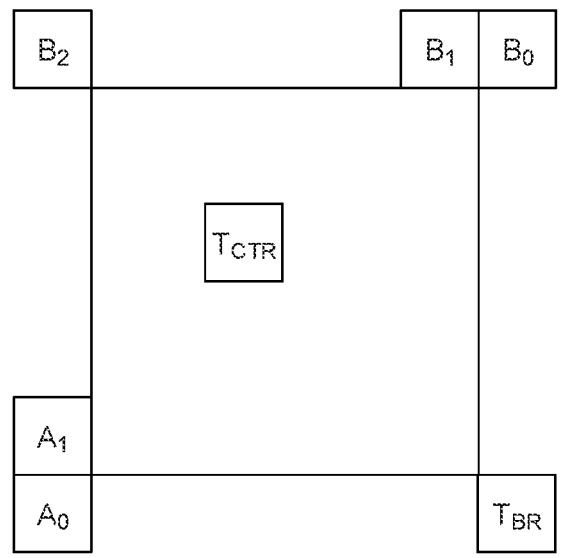
FIG. 7 shows the neighbouring PUs used to derive the spatial and temporal MVPs for both AMVP and Merge scheme.
Figure 8:
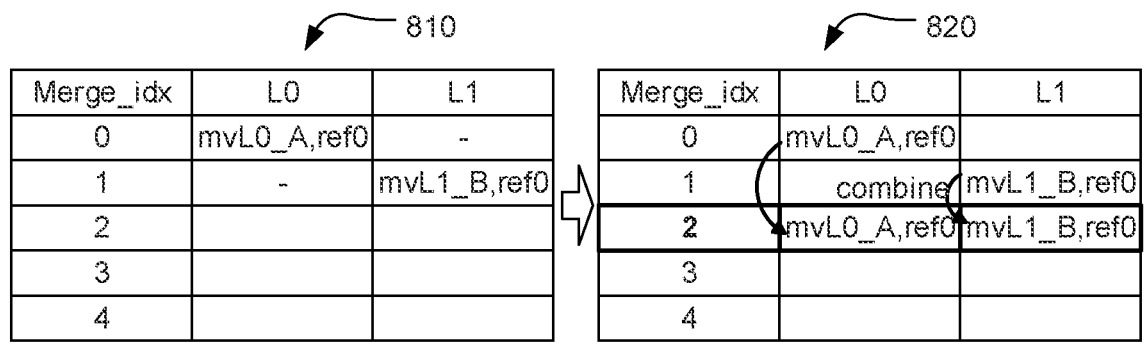
FIG. 8 illustrates an example of the derivation process for combined bi-predictive Merge candidate.
Figure 8:
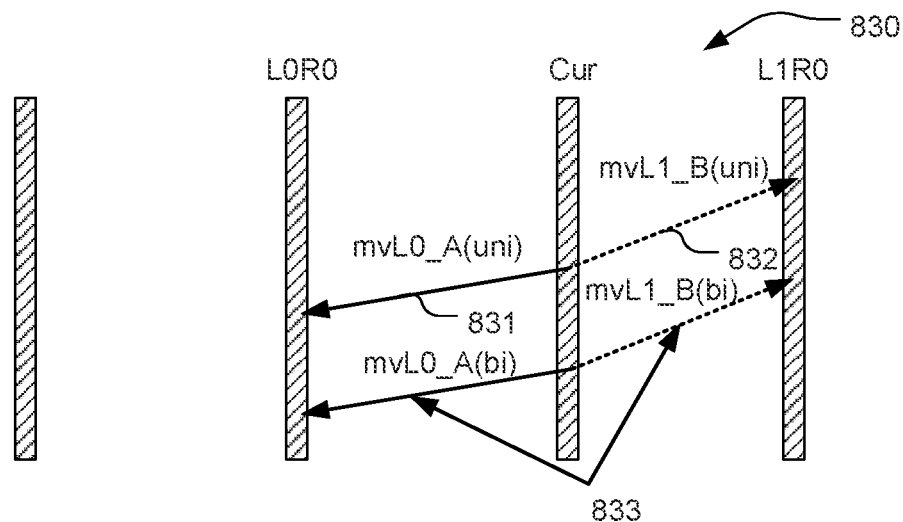
Figure 9A:
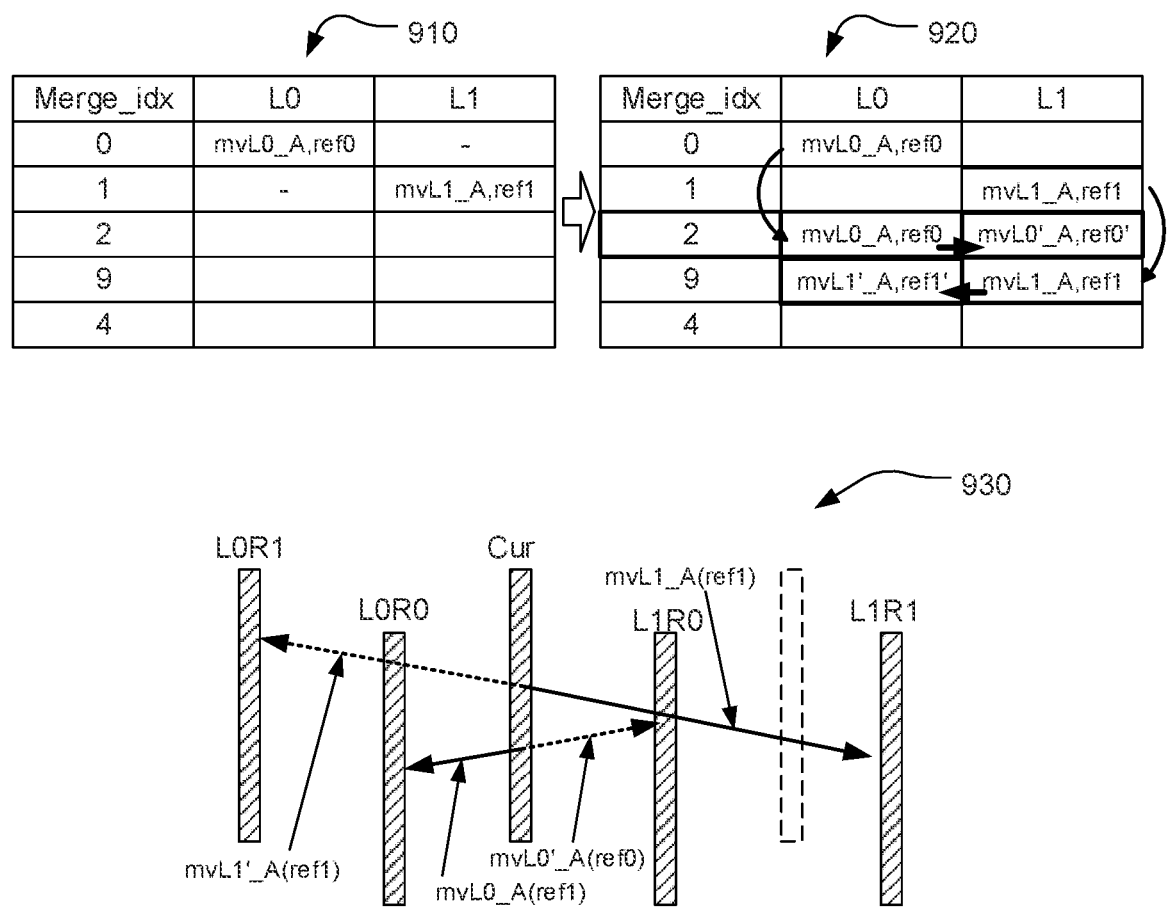
FIG. 9A illustrates an example of the derivation process of the scaled bi-predictive Merge candidate, where candidate list on the left corresponds to an original candidate list and the candidate list on the right corresponds to the expanded candidate list including two generated bi-prediction MVPs.
Figures 9B, 9C, 10:
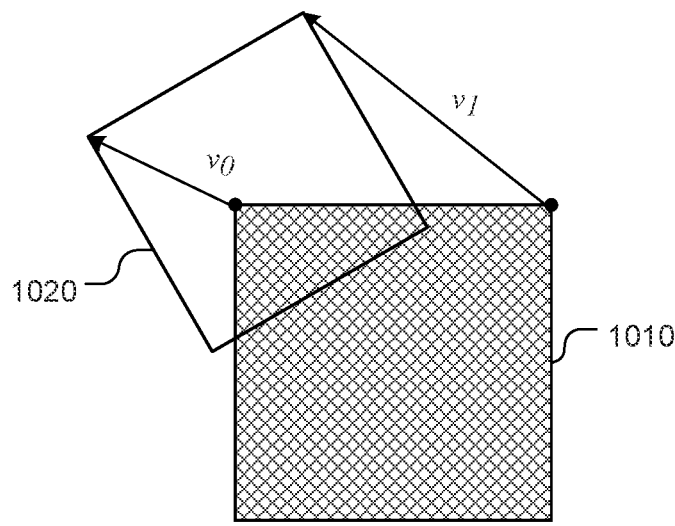
FIG. 9B illustrates an example of adding zero vector Merge candidates, where the candidate list on the left corresponds to an original Merge candidate list and the candidate list on the right corresponds to the extended Merge candidate list by adding zero candidates.
FIG. 9C illustrates an example for adding zero vector AMVP candidates, where the candidate lists on the top correspond to original AMVP candidate lists (L0 on the left and L1 on the right) and the candidate lists at the bottom correspond to the extended AMVP candidate lists (L0 on the left and L1 on the right) by adding zero candidates.
FIG. 10 illustrates an example of four-parameter affine model, where a current block and a reference block are shown.
Figure 11A:
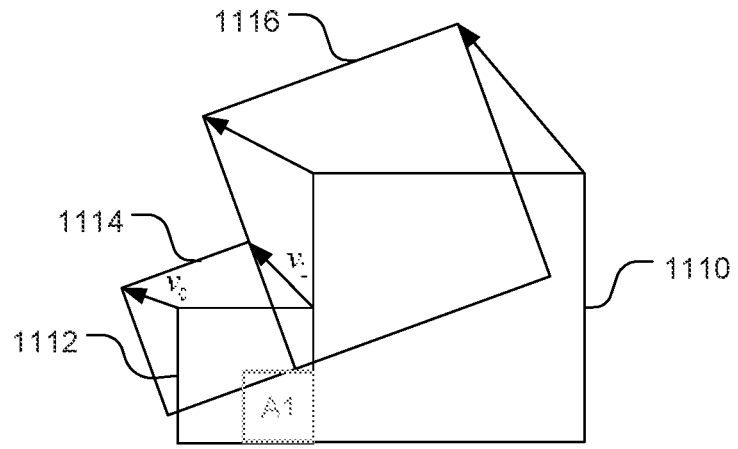
FIG. 11A illustrates an example of inherited affine candidate derivation, where the current block inherits the affine model of a neighbouring block by inheriting the control-point MVs of the neighbouring block as the control-point MVs of the current block.
Figure 11B:
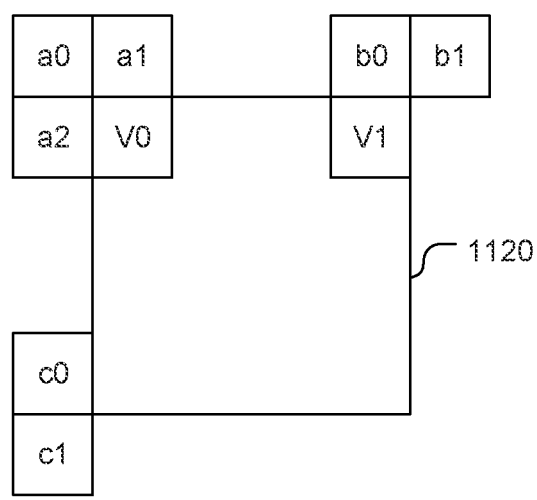
FIG. 11B illustrates the neighbouring block set used for deriving the corner-derived affine candidate, where one MV is derived from each neighbouring group.

In another embodiment, for the proposed shared list methods (e.g. shared candidate list inside one sub-tree and common shared boundary), when deriving the reference block position, the current block position/size/depth/shape/width/height is used. However, if the reference block is inside of the root CU or the shared boundary, the reference block position is pushed or moved outside of the root CU or the shared boundary. For example, in FIG. 7, the block $B_1$ is the above block of the top-right sample of the current block. If the block $B_1$ is inside of the root CU or the shared boundary, the position of block B1 is moved above to the first nearest block out side of the root CU or the shared boundary. In another embodiment, when deriving the reference block position, the current block position/size/depth/shape/width/height is used. However, if the reference block is inside of the root CU or the shared boundary, the reference block/MV is not used (treated as unavailable). In another embodiment, when deriving the reference block position, the current block position/size/depth/shape/width/height is used. However, if the reference block is inside of the root CU or the shared boundary, the reference block/MV is not used (treated as unavailable).

In one embodiment, for the temporal collocated MV derivation, the collocated MV of the root CU or the shared boundary is shared/used for all the children CUs. In another embodiment, for the temporal collocated MV derivation, the collocated MV of each CU/block is used instead of the shared temporal collocated MV.

Method—MER and Shared List Both Existing for QTMTT Structure

In this method, both MER (Merge Estimation Region) and shared list concept may both be enabled in QTMTT structure. Merge estimation region as referred in HEVC corresponds to a region that all leaf CUs inside this region can be processed in parallel. In other words, the dependency among the leaf CUs inside this region can be eliminated. The QTMTT corresponds to a type of multi-type tree (MTT) block partitioning where quadtree and another partition tree (e.g. binary tree (BT) or ternary tree (TT)) are used for MTT. In one embodiment, for normal Merge and ATMVP, the leaf CUs in the root CU uses shared list. But for affine merge, it uses QTMTT-based MER. In another embodiment, for some prediction mode, the leaf CUs in the root CU uses shared list, but for other Merge mode or AMVP mode, it uses MER concept.

In one embodiment, the concept of the Merge Estimation Region (MER) in HEVC can be extend to the QTBT or the QTBTTT (quadtree/binary tree/ternary tree) structure. The MER can be non-square. The MER can be in different shape or size depending on the structure partition. The size/depth/area/width/height can be predefined or signalled in the sequence/picture/slice-level. For the width/height of the MER, the log 2 value of the width/height can be signalled. For the area/size of the MER, the log 2 value of the size/area can be signalled. When a MER is defined for a region, the CU/PU in this MER cannot be used as the reference CU/PU for Merge mode candidate derivation, such that the CU/PU in this MER is excluded from Merge mode candidate derivation. For example, the MVs or the affine parameters of the CU/PU in this MER cannot be referenced by the CU/PU in the same MER for Merge candidate or affine merge candidate derivation. Those MVs and/or affine parameters are treated as unavailable for the CU/PU in the same MER. For sub-block mode (e.g. ATMVP mode) derivation, the size/depth/shape/area/width/height of the current CU is used. If the reference CU is in the same MER, the MV information of the reference CU cannot be used.

When a MER area/size/depth/shape/area/width/height is defined (e.g. predefined or signalled), if the current CU is larger than or equal to the defined area/size/shape/area/width/height and one of the child partition or all of the child partitions or part of the child partition is smaller than the area/size/shape/area/width/height the current CU is one MER. In another example, if the depth of the current CU is smaller than or equal to the defined depth and the depth of one of child partition, or all of the child partition or part of the child partition is larger than the defined depth, the current CU is one MER. In another embodiment, if the current CU is smaller than or equal to the defined area/size/shape/area/width/height and the parent CU is larger than the defined area/size/shape/area/width/height, the current CU is one MER. In another example, if the depth of the current CU is larger than or equal to the defined depth and the parent is smaller than the defined depth, the current CU is one MER. For example, if the defined area is 1024 and a CU size is 64×32 (width equal to 64 and height equal to 32), and the vertical TT split is used (e.g. the 64×32 CU partitioned into a 16×32 sub-CU, a 32×32 sub-CU, and a 16×32 sub-CU), the 64×32 block is one MER in one embodiment. The child CU in this 64×32 uses the shared list. In another embodiment, the 64×32 block is not the MER. However, the 16×32 sub-CU, the 32×32 sub-CU and the 16×32 sub-CU are MERs, respectively. In another embodiment, for a defined MER area/size/depth/shape/area/width/height, when doing the TT split, the MER area/size/depth/shape/area/width/height can be different in different TT partition. For example, for the first and the third partitions, the threshold of MER area/size/shape/area/width/height can be divided by 2 (or the depth increased by 1). For the second partition, the threshold of MER area/size/depth/shape/area/width/height keeps the same.

Method—Reduced Merge Candidate List Depending on CU Dimension

This method is applied to Merge mode or other candidate list modes, such as affine Merge list (only affine Merge candidates), or unified affine-ATMVP Merge list (grouping affine Merge candidate and ATMVP candidate into a list), or ATMVP-normal Merge list (the translational Merge candidate and ATMVP candidate in one list), and so on.

In another embodiment, it removes some candidates according to CU size or any other CU-size related feature. If a CU size is larger than a pre-defined threshold (e.g. area=16), some candidates (e.g. ATMVP) are removed (or called excluded) from the construction of the candidate list In another embodiment, the turning-off of ATMVP depends on the width or height of the current CU, which also relate to CU size. In one example, if the CU width is smaller than a pre-defined threshold, the ATMVP is turned off. In another example, if the CU height is smaller than a pre-defined threshold, the ATMVP is turned off. In another embodiment, if the CU height is smaller than a pre-defined threshold or the CU width is smaller than another pre-defined threshold, the ATMVP is turned off. In another embodiment, if the CU height is smaller than a pre-defined threshold and the CU width is smaller than another pre-defined threshold, the ATMVP is turned off.

In one example, the ATMVP is turned off (i.e., disabled or excluded) when the width is smaller than 8 or the height is smaller than 8.

In another embodiment, the turning-off of ATMVP depends on the width or height of the current CU. For example, if the CU width is larger than a pre-defined threshold, the ATMVP is turned off. In another example, if the CU height is larger than a pre-defined threshold, the ATMVP is turned off. In another embodiment, if the CU height is larger than a pre-defined threshold or the CU width is larger than another pre-defined threshold, the ATMVP is turned off. In another embodiment, if the CU height is larger than a pre-defined threshold and the CU width is larger than another pre-defined threshold, the ATMVP is turned off.

In another embodiment, the turning-off of ATMVP depends on the shape of current CU. For example, if the CU aspect ratio (i.e., width/height or height/width) is smaller than a pre-defined threshold, the ATMVP is turned off. In another example, if the CU aspect ratio (i.e., width/height or height/width) is larger than a pre-defined threshold, the ATMVP is turned off.

The size threshold, width threshold or height threshold can be fixed and pre-defined for all picture size and all bit-stream. In another embodiment, the size threshold, width threshold or height threshold can be determined adaptively according to the picture size. For different picture sizes, the thresholds may be different. In another embodiment, the size threshold, width threshold or height threshold can be signalled from the encoder to the decoder. The minimum sizes of units for signalling the size threshold/width threshold/height threshold can also be separately coded in the sequence level, picture level, slice level or PU level.

Shared Merge List MV for the Merge/Inter/Affine-Merge/Affine-Inter/ATMVP/Sub-Block Candidate List Construction The candidate list generated at the root CU or the shared boundary can be used for the Merge/Inter/affine-Merge/affine-Inter/ATMVP/sub-block candidate list construction of the children CUs even when the shared list is not enabled. The candidates of the root CU or the shared boundary can be added into the candidate list of the children CUs. The shape/size/depth/width/height of the root CU or the shared boundary can be predefined, signalled (e.g. in the sequence/picture/slice/tile/CTU-row/CTU-level), or derived. For example, the root CU can be the parent N-level CU. The N can be an integer.

In one embodiment, two thresholds can be defined: one is larger and one is smaller. A larger root CU or a larger shared boundary is defined/determined by the larger threshold. A candidate list is generated at the larger root CU or the larger shared boundary. For all the child CUs in the larger root CU or the larger shared boundary, the candidates of the larger root CU or the larger shared boundary can be added into the candidate list of the children CUs. A smaller root CU or a smaller shared boundary is defined/determined by the smaller threshold. A candidate list is generated at the smaller root CU or the smaller shared boundary. When generating the candidate list of the smaller root CU or the smaller shared boundary, the candidates of the larger root CU or the larger shared boundary can be added. For the children CUs in the smaller root CU or the smaller shared boundary, the candidate list generated at the smaller root CU or the smaller shared boundary is used.

The foregoing proposed methods can be implemented in encoders and/or decoders. For example, any of the proposed methods can be implemented in an entropy encoding module or a block partition module in an encoder, and/or an entropy parser module or a block partition module in a decoder. Alternatively, any of the proposed methods can be implemented as a circuit coupled to the entropy encoding module or the block partition module in the encoder, and/or the entropy parser module or the block partition module in the decoder, so as to provide the information needed by the entropy parser module or the block partition module.

Figure 14:
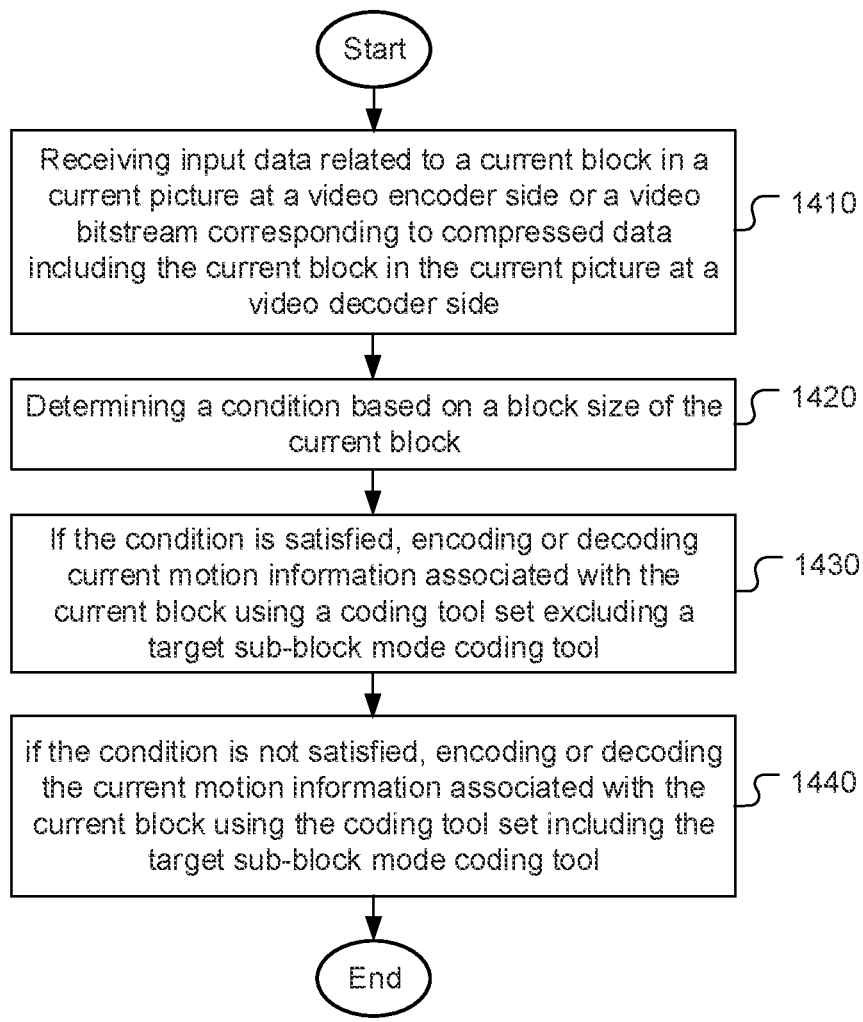
FIG. 14 illustrates a flowchart of an exemplary Inter prediction for video coding, wherein said video coding allows sub-block mode motion vector prediction according to an embodiment of the present invention.

FIG. 14 illustrates a flowchart of an exemplary Inter prediction for video coding, wherein said video coding allows sub-block mode motion vector prediction according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data related to a current block in a current picture are received at a video encoder side or a video bitstream corresponding to compressed data including the current block in the current picture are received at a video decoder side are received in step 1410. A condition is determined based on a block size of the current block in step 1420. If the condition is satisfied, the current motion information associated with the current block is encoded or decoded using a coding tool set excluding a target sub-block mode coding tool in step 1430. If the condition is not satisfied, the current motion information associated with the current block is encoded or decoded using the coding tool set including the target sub-block mode coding tool in step 1440.

Figure 15:
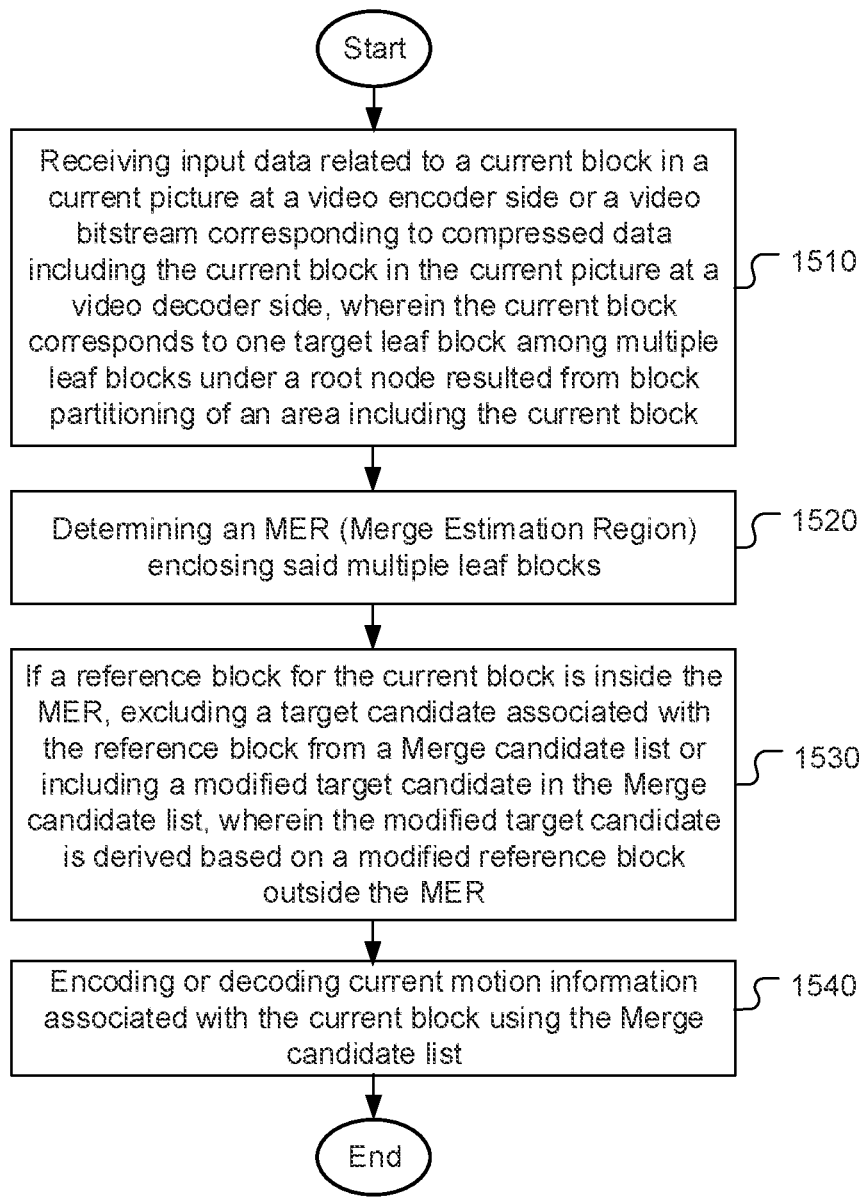
FIG. 15 illustrates a flowchart of an exemplary Inter prediction for video coding, wherein neighbouring blocks inside one root region are cancelled or pushed for Merge candidate according to an embodiment of the present invention.

FIG. 15 illustrates a flowchart of an exemplary Inter prediction for video coding, wherein neighbouring blocks inside one root region are cancelled or pushed for Merge candidate according to an embodiment of the present invention. According to this method, input data related to a current block in a current picture are received at a video encoder side or a video bitstream corresponding to compressed data including the current block in the current picture are received at a video decoder side are received in step 1510, where the current block corresponds to one target leaf block among multiple leaf blocks under a root node resulted from block partitioning of an area including the current block. An MER (Merge Estimation Region) enclosing said multiple leaf blocks is determined in step 1520. If a reference block for the current block is inside the MER, a target candidate associated with the reference block is excluded from a Merge candidate list or a modified target candidate is included in the Merge candidate list in step 1530, wherein the modified target candidate is derived based on a modified reference block outside the MER. Current motion information associated with the current block is encoded or decoded using the Merge candidate list in step 1540.

Figure 16:
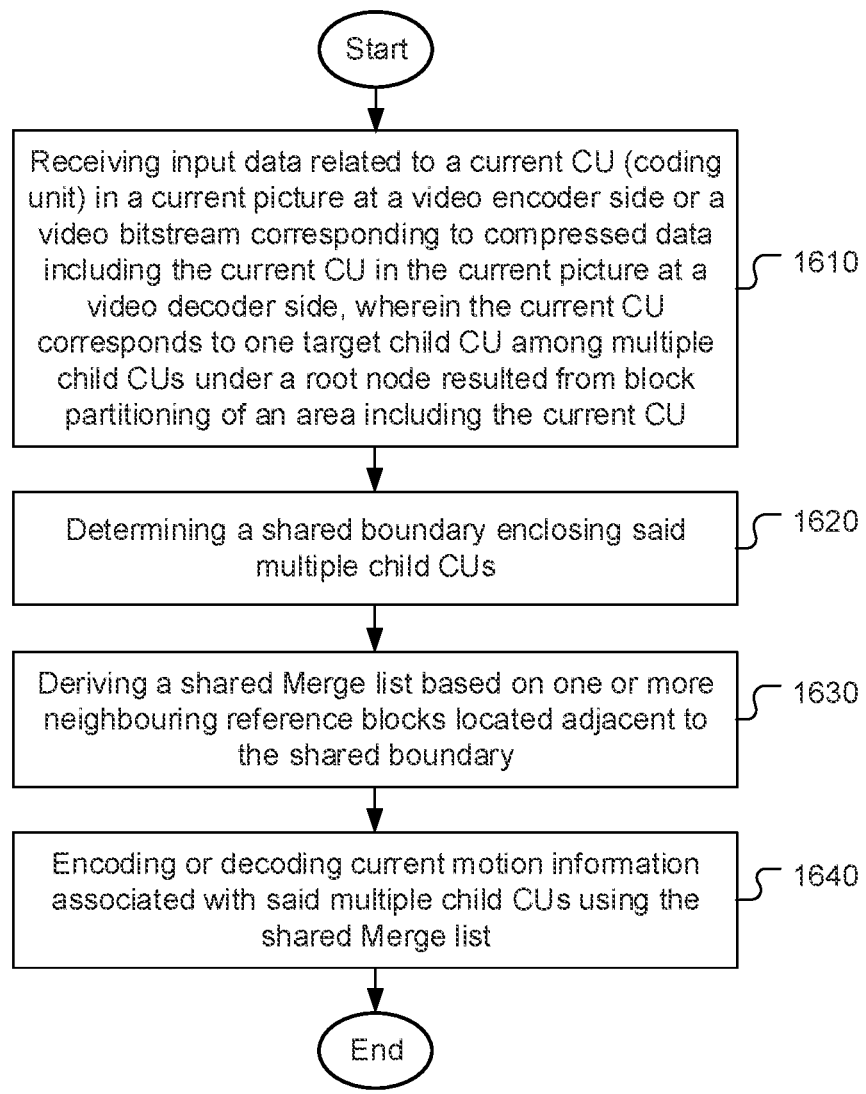
FIG. 16 illustrates a flowchart of an exemplary Inter prediction for video coding, wherein child blocks inside one root region share a common Merge candidate list according to an embodiment of the present invention.

FIG. 16 illustrates a flowchart of an exemplary Inter prediction for video coding, wherein child blocks inside one root region share a common Merge candidate list according to an embodiment of the present invention. According to this method, input data related to a current CU (coding unit) in a current picture are received at a video encoder side or a video bitstream corresponding to compressed data including the current CU in the current picture is received at a video decoder side in step 1610, where the current CU corresponds to one target child CU among multiple child CUs under a root node resulted from block partitioning of an area including the current CU are received. A shared boundary enclosing said multiple child CUs is determined in step 1620. A shared Merge list is derived based on one or more neighbouring reference blocks located adjacent to the shared boundary in step 1630. Current motion information associated with said multiple child CUs is encoded or decoded using the shared Merge list in step 1640.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of Inter prediction for video coding, the method comprising:

receiving input data related to a current block in a current picture at a video encoder side or a video bitstream corresponding to compressed data including the current block in the current picture at a video decoder side, wherein the current block corresponds to one target leaf block among multiple leaf blocks under a root node resulted from block partitioning of an area including the current block;

determining an MER (Merge Estimation Region) enclosing said multiple leaf blocks;

if a reference block for the current block is inside the MER, excluding a target candidate associated with the reference block from a Merge candidate list or including a modified target candidate in the Merge candidate list, wherein the modified target candidate is derived based on a modified reference block outside the MER, wherein the Merge candidate list is derived for a sub-block mode, wherein excluding a target candidate comprises setting a temporal motion vector of a sub-block temporal MVP mode to zero; and encoding or decoding current motion information associated with the current block using the Merge candidate list.

2. The method of claim 1, wherein the Merge candidate list is derived for SbTMVP (Subblock-based Temporal Motion Vector Prediction).

3. The method of claim 1, wherein the modified reference block is located adjacent to a boundary of the MER.

4. An apparatus of Inter prediction for video coding, wherein said video coding allows sub-block mode motion vector prediction, the apparatus comprising one or more electronic circuits or processors arranged to:

receive input data related to a current block in a current picture at a video encoder side or a video bitstream corresponding to compressed data including the current block in the current picture at a video decoder side, wherein the current block corresponds to one target leaf block among multiple leaf blocks under a root node resulted from block partitioning of an area including the current block;

determine an MER (Merge Estimation Region) enclosing said multiple leaf blocks;

if a reference block for the current block is inside the MER, exclude a target candidate associated with the reference block from a Merge candidate list or include a modified target candidate in the Merge candidate list, wherein the modified target candidate is derived based on a modified reference block outside the MER, wherein the Merge candidate list is derived for a sub-block mode, wherein excluding a target candidate comprises setting a temporal motion vector of a sub-block temporal MVP mode to zero; and encode or decode current motion information associated with the current block using the Merge candidate list.

* * * * *